Nov. 6, 1962  L. W. SCHMIDT  3,062,092

PHOTOELECTRIC MEASURING DEVICE

Filed Nov. 27, 1959

INVENTOR.
LAWRENCE W. SCHMIDT

BY

ATTORNEY

Patented Nov. 6, 1962

3,062,092
PHOTOELECTRIC MEASURING DEVICE
Lawrence W. Schmidt, Los Angeles, Calif., assignor to Hoffman Electronics Corporation, a corporation of California
Filed Nov. 27, 1959, Ser. No. 855,673
1 Claim. (Cl. 88—23)

The present invention relates to light-sensitive electric measuring devices, and more particularly to photoelectric measuring devices that can be used as exposure meters for photography.

Photoelectric exposure meters, in which a light sensitive cell and a meter or indicator calibrated in camera settings and responsive to the illumination upon the cell form the basic components, are old in the art. Photographers find them invaluable as an aid in determining the proper camera settings to use for taking photographs. The photographer generally holds the exposure meter up to the light and obtains the proper camera settings from an indicator upon the exposure meter. He can then set his camera according to the readings. One of the difficulties encountered with exposure meters is that changes in ambient temperature affect the output of the photoelectric converter, resulting in a false reading. Another difficulty is that changes in ambient temperature often cause changes in the gain or amplification of amplifiers associated with the meter circuit, again resulting in a false reading.

It is an object of the present invention, therefore, to provide a novel photoelectric measuring device.

It is another object of the present invention to provide a photoelectric exposure meter in which changes in ambient temperature affecting the output of the photoelectric converter do not cause a false reading.

It is still another object of the present invention to provide a photoelectric exposure meter in which changes in ambient temperature causing a change in the gain of the amplifiers associated with the meter circuit do not cause a false reading.

According to one embodiment of the present invention, a photoelectric converter is connected to a first amplifier, which is connected to a galvanometer, or null indicator. The output of a second amplifier having a thermistor in its circuit is connected to the galvanometer so as to oppose the output of the first amplifier. Any changes in gain or steady state currents produced as a result of changes in ambient temperature affect both amplifiers equally, and thus, the net effect upon the galvanometer is zero. In addition, the thermistor compensates for any change in the output of the photoelectric converter that is caused as a consequence of changes in ambient temperature.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which:

Figure 1:
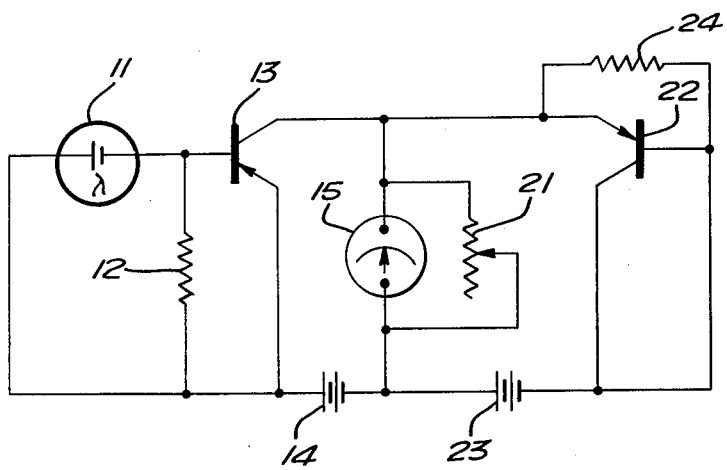
FIGURE 1 is a schematic diagram of a device according to the present invention.

Referring now to the drawings, FIGURE 1 shows one end of photoelectric converter 11 connected to one end of resistor 12 and the base of NPN transistor 13. The other end of photoelectric converter 11 is connected to the other end of resistor 12, the emitter of transistor 13, and the positive terminal of battery 14. Meter 15 is connected across the collector of transistor 13 and the negative terminal of battery 14. Variable resistor 21 is connected across meter 15. The emitter of NPN transistor 22 is connected to the same end of meter 15 that is connected to the collector of transistor 13. The collector of transistor 22 is connected to the negative terminal of battery 23, the positive terminal of which is connected to the same end of meter 15 that is connected to the negative terminal of battery 14. Resistor 24 is connected across the base and emitter of transistor 22. The base of transistor 22 is connected to the negative terminal of battery 23. If desired, PNP transistors could be used instead of NPN transistors.

Figure 2:
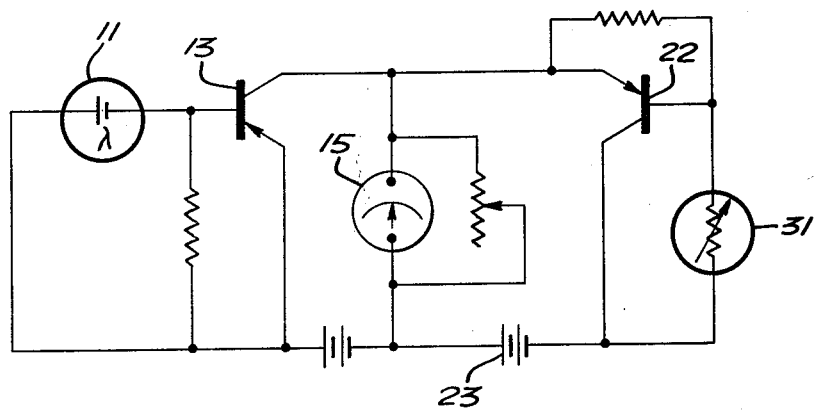
FIGURE 2 is a schematic diagram of another embodiment of the present invention.

Photoelectric converter 11, which is a photovoltaic cell, or a solar cell, converts light energy into electrical current, which is amplified by transistor 13. Meter 15, which reads zero when unconnected, is a calibrated galvanometer connected so as to indicate the output of converter 11. When meter 15 indicates an output, the resistance of resistor 21 is varied until meter 15 reads zero again. Resistor 21 is calibrated in terms of camera lens openings and shutter speeds, so that when resistor 21 has been adjusted and meter 15 reads zero, the proper camera settings for the existing illumination can be obtained directly from resistor 21. Transistor 22 is connected across meter 15 so that the output of transistor 22 opposes the output of transistor 13. If transistors 13 and 22 are the same kind and have equal gains, any change in the gain of transistor 13 produced as a result of a change in ambient temperature will have no affect upon the reading of meter 15, since the gain of transistor 22 will be changed an equal amount, and the gain changes will offset each other. A circuit modification that will accommodate different kinds of transistors will now be described FIGURE 2 is a schematic diagram of a circuit that is identical to the circuit of FIGURE 1 except that the base of transistor 22 is connected to the negative terminal of battery 23 through thermistor 31. The resistance of thermistor 31 as well as the gains of transistors 13 and 22, is directly proportional to the ambient temperature. Thus, if the ambient temperature decreases and the gains of transistors 13 and 22 decrease different amounts, because of the fact that transistors 13 and 22 are different types, then the resistance of thermistor 31 will decrease a predetermined amount to change the bias of transistor 22 sufficiently to cancel the effect upon meter 15 of any difference in gains.

The use of a thermistor also prevents any false readings which might arise as a consequence of the fact that the output of a photoelectric converter is inversely proportional to the temperature of the cell. For example, an increase in ambient temperature causes a decrease in the output of converter 11 and an increase in the resistance of thermistor 31. The increased resistance of thermistor 31 causes a decrease in the gain of transistor 22, and the net effect upon meter 15 of the change in ambient temperature is zero. Thus, meter 15 will respond to the illumination upon converter 11, but not to the effect of temperature thereupon, and a false reading is thereby avoided. It is to be noted that thermistor 31 is merely a temperature sensitive device and could be replaced by other such devices, such as a second photoelectric converter that is kept in the dark.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

A light metering device utilizing a photoelectric transducer and an amplifying transistor, both characterized by undesired variations in their output currents due to changes in ambient temperature, said device including:

(a) circuit means connecting the current output of said transducer to the input terminals of said amplifying transistor, (b) a current-indicating meter connected through a source of current to the output terminals of said amplifying transistor, (c) a compensating transistor having its output terminals connected through a source of current to the terminals of said meter for conduction of current through said meter in the direction opposite to the direction of current flow therethrough due to said first-named source of current, said compensating transistor having a different variation in gain with changes in ambient temperature from that of said amplifying transistor, (d) a biasing resistor connected between input terminals of said compensating transistor to establish a net compensated current flow through said meter that is substantially independent of temperature-induced changes in the characteristics of both said transistors, and (e) a temperature-dependent resistor connected across the input terminals of said compensating transistor, said temperature-dependent resistor and said compensating transistor and said amplifying transistor and said photoelectric transducer being positioned to be subject to the same ambient temperature variations, said temperature-dependent resistor being selected so that its resistance varies with temperature in a predetermined amount and sense to cancel the effect upon said meter of differences between the gains of said transistors caused by ambient temperature variations, and further to cancel the effect upon said meter of changes in the output of said photoelectric transducer caused by ambient temperature variations.

References Cited in the file of this patent

UNITED STATES PATENTS

| | | |
|---|---|---|
| 2,751,549 | Chase | June 19, 1956 |
| 2,867,695 | Buie | Jan. 6, 1959 |
| 2,871,376 | Kretzmer | Jan. 27, 1959 |
| 2,889,416 | Shea | June 2, 1959 |
| 2,897,720 | Offner | Aug. 4, 1959 |
| 2,898,802 | Ljungberg et al. | Aug. 11, 1959 |
| 2,909,669 | Jacobs | Oct. 20, 1959 |
| 2,945,187 | McCollom | July 12, 1960 |